Dec. 30, 1952     J. M. VOLPI     2,623,586
FABRIC SLITTING APPARATUS
Filed Jan. 25, 1949     2 SHEETS—SHEET 1
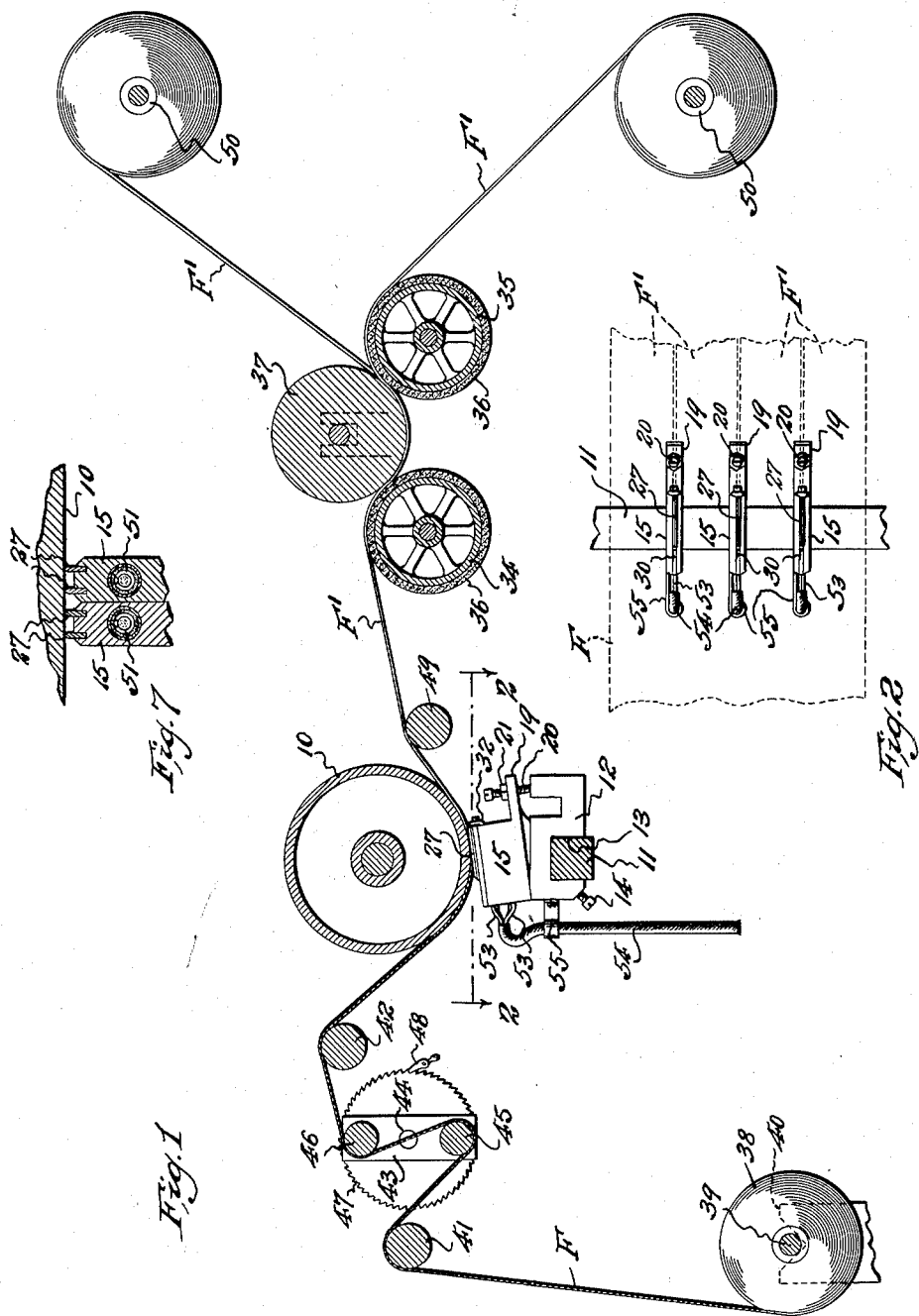
INVENTOR.
Joseph M. Volpi,
BY George D. Richards,
Attorney Dec. 30, 1952  J. M. VOLPI  2,623,586
FABRIC SLITTING APPARATUS
Filed Jan. 25, 1949  2 SHEETS—SHEET 2
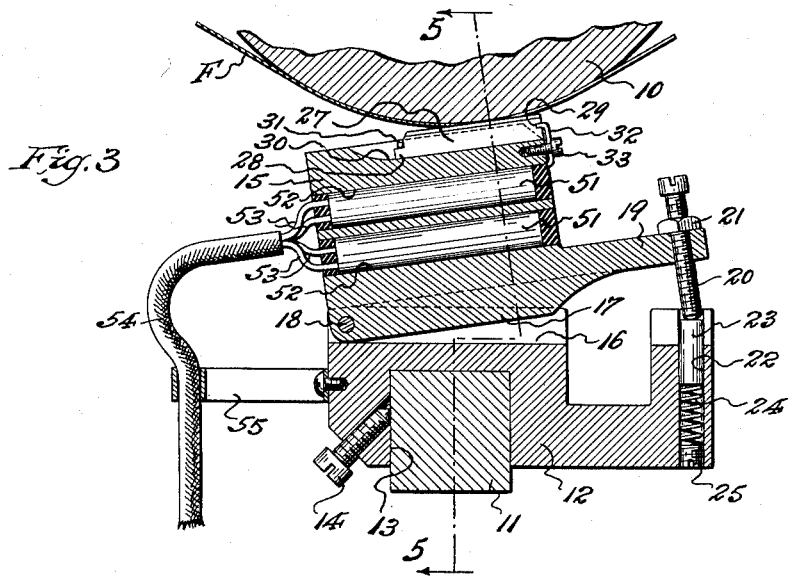
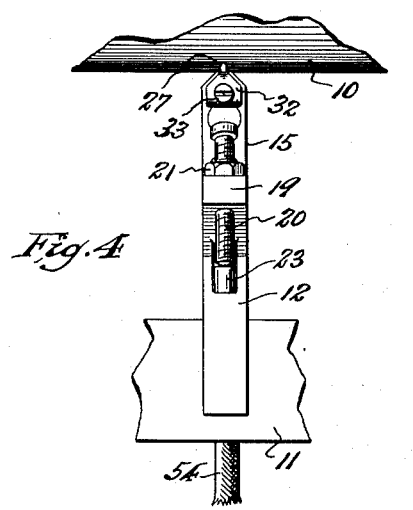
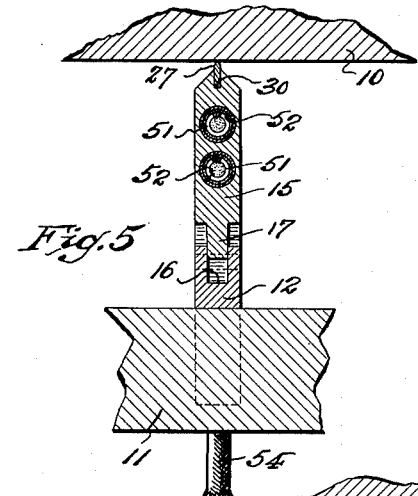
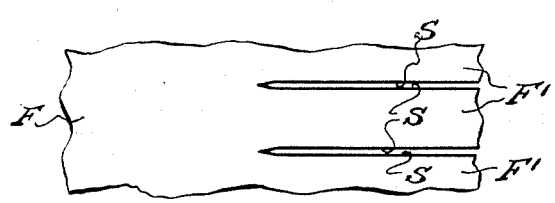
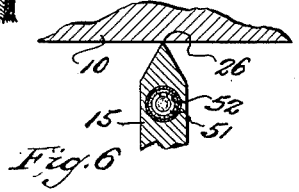
INVENTOR.
Joseph M. Volpi,
BY George D. Richards,
Attorney Patented Dec. 30, 1952

2,623,586

UNITED STATES PATENT OFFICE 2,623,586

FABRIC SLITTING APPARATUS

Joseph M. Volpi, Brooklyn, N. Y.

Application January 25, 1949, Serial No. 72,727

2 Claims. (Cl. 164—39)

This invention relates to fabric slitting apparatus, and has reference, more particularly, to apparatus for producing ribbons from piece goods, and especially from piece goods woven from threads, filaments or yarns of synthetic materials.

The invention has for an object to provide improved apparatus for cutting piece goods into ribbons of desired width, said apparatus including novel goods cutting or slitting instrumentalities and means for passing the goods therethrough.

The invention has for another object to provide novel cutting or slitting instrumentalities for the stated purposes comprising a hard surfaced roll to support the goods to be cut or slit and a novel construction of knife provided with a detachable cutting blade having its cutting edge tangent to and bearing against the surface of said supporting roll, means being provided for causing the cutting knife to bear against the goods supporting roll surface under suitably regulated tension.

The invention has for a further object to provide novel cutting instrumentalities for the stated purposes including a heated cutting knife especially adapted for use in slitting piece goods woven from threads, filaments or yarns of synthetic material into ribbons, which heated cutting knife not only slits the goods but, at the same time, fuses together the cut ends of the filaments at the margins of the produced ribbons so as to provide the latter with non-raveling and non-fraying selvage edges.

Other objects of the invention, not at this time more particularly enumerated, will be understood from the following detailed description of the same.

An illustrative embodiment of the invention is shown in the accompanying drawings, in which:

Fig. 1 is a schematic view of fabric cuttting or slitting apparatus made according to the invention; and Fig. 2 is a fragmentary horizontal sectional view, taken on line 2—2 in Fig. 1.

Fig. 3 is a longitudinal sectional view of a cutting instrumentality of the apparatus, drawn on an enlarged scale; Fig. 4 is an end elevational view of said cutting instrumentality, viewed from the right in Fig. 3; and Fig. 5 is a transverse vertical sectional view of the same, taken on line 5—5 in Fig. 3.

Figs. 6 and 7 are fragmentary views similar to that of Fig. 5 but showing modified forms of the cutting instrumentality.

Fig. 8 is a fragmentary plan view of piece goods in process of being slit into ribbons, and indicating the fused selvage edges with which the ribbons are provided when cut with the heated knife.

Similar characters of reference are employed in the above described views, to indicate corresponding parts.

Referring to the drawings, the fabric cutting or slitting apparatus of this invention includes a suitably supported roll 10, which is preferably made from a suitable metal, at least the peripheral surface of which is hardened so as to resist scoring by the cutting or slitting knives of the apparatus with which said roll 10 cooperates. The roll 10 serves to back the fabric F which is caused to traverse the same, subject to the cutting or slitting action of said knives. The roll 10 preferably rotates at a peripheral speed substantially corresponding to the linear speed at which the fabric F is caused to move over the same.

The novel cutting or slitting knives of the apparatus are mounted adjacent to the roll 10 so as to bear against its periphery, and are adjustably supported upon a transverse bolster or bridge bar 11 which is disposed beneath said roll 10.

Each knife comprises a carrier plate 12 which is indented at its lower portion by a downwardly open notch or yoke socket 13 adapted to receive the bolster or bridge bar 11, to which said carrier plate is releasably secured by a set or lock screw 14 with which the latter is provided. When thus mounted on the bolster or bridge bar 11, the carrier plate 12 upstands therefrom in a vertical plane transversely perpendicular to the axis of the roll 10.

Pivotally connected with said carrier plate 12, for upswinging movement therefrom, is a knife member 15. To guide the pivoted knife member for swinging movement in the vertical plane of the carrier plate 12, the latter is provided in its top with a longitudinally extending, upwardly open channel 16. The knife member 15 is provided at its bottom with a dependent longitudinally extending rib or flange 17 which is receivable in said channel 16 of the carrier plate 12. The rearward end of the knife member 15 is pivoted to the carrier plate 12 by a pivoting pin 18 which extends transversely through the side walls of the channel 16 of the latter so as to pass through the rib or flange 17 of the former. Extending longitudinally outward from the lower forward end portion of the knife member 15 is a rigid lever arm 19. Threaded downwardly through the lever arm 19 is an adjustable thrust screw 20, which is adapted to be secured in axially adjusted relation to said lever arm by a lock nut 21. The forward end portion of the carrier plate 12 is provided with a perpendicular bore 22 in the upper end portion of which is slidably mounted a plunger 23. Said plunger 23 is adapted to thrust against the thrust screw 20. The plunger 23 is upwardly urged by a compression spring 24 which is housed in the bore 22 below said plunger, and which is backed by a screw-plug 25 threaded into the lower end of said bore 22. It will be obvious that the spring actuated plunger 23 exerts, through the thrust screw 20 and lever arm 19, an upward thrust upon the outer free end of the knife member 15, whereby to move the same into cooperative engagement with the surface of the roll 10 for cutting or slitting effect upon fabric F which is caused to traverse the latter.

In a simple form of knife member 15, which may be made of steel or other metal of suitable hardness, the top thereof is beveled to provide an acutely sharpened cutting edge 26 integral therewith (see Fig. 6).

In another form, and one deemed to be preferable, the knife member 15 is provided with a separable cutting blade. An illustrative form of separable cutting blade and means for detachably securing the same in operative assembled relation to the body of the knife member 15 comprises (as shown in Figs. 3 to 5 more particularly) a separate cutting blade 27. This cutting blade 27 is preferably made of tungsten carbide steel to assure long life and efficiency. Said cutting blade 27 is provided at its rearward end with a projecting anchor lug 28 disposed in alignment with the base of its body, and said blade is further provided at its forward end with an indenting locking notch 29. Provided in the top of the body of the knife member 15 is a longitudinal seating channel 30 for reception of the cutting blade 27; said seating channel being of less depth than the height of the blade, whereby the sharpened cutting edge of the latter projects freely from the top of the knife member 15 for cooperative engagement with the surface of the fabric supporting roll 10. The cutting blade 27 is firmly attached to the knife member 15, for operative assembly with the latter. To this end, the rearward anchor lug 28 of the blade is engaged beneath a cross-pin 31 which is affixed to the knife member body so as to bridge across the blade seating channel 30 of the latter. The locking notch 29 at the forward end of the cutting blade is engaged and held by the angular tang of a coupling clip 32 which is detachably fixed to the forward end of the knife member body by means of a fastening screw 33.

The apparatus of this invention includes means for moving a fabric F over the supporting or cutting roll 10 subject to the cutting or slitting action of one or more of the novel knife members above described. The means for so moving the fabric F is subject to more or less variation in form and arrangement, but an illustrative and preferred form thereof comprises (as shown in Fig. 1) traction means for drawing the fabric F between the cutting roll 10 and the cutting or slitting knife member or members which cooperate therewith. Said traction means includes a pair of suitably driven transverse traction rollers 34—35 which are disposed in horizontal, parallelly spaced apart relation beyond the cutting roll 10. The peripheries of said traction rollers 34—35 are faced with relatively soft and non-abrasive material 36, such e. g. as felt, whereby to frictionally engage the fabric F so as to impart linear draft or movement thereto, but without risk of abrading or imparting undue distortional stresses to said fabric. Mounted above and intermediate said traction rollers 34—35, so as to be subject to gravitational movement toward the same, is a weighty steel roller 37, which, by its weight, functions to hold the fabric F in frictional contact with the faced peripheries of the rollers 34—35 subject to the draft effect thereof.

The fabric F, to be drawn through the cutting or slitting instrumentalities, is supplied from a supply roll 38 which is mounted on a carrier shaft 39 adapted to be rotatably supported by suitable bearings 40. Suitably positioned transverse guide bars 41 and 42 are provided between the supply roll 38 and the cutting roll 10. Intermediate these guide bars 41 and 42 is arranged means for maintaining the fabric under tension whereby to assure tautness thereof as it moves to and over the cutting roll. An illustrative form of such tensioning means comprises a frame 43 which is rotatively adjustable about the axis of its journaling trunnions 44. Said frame 43 is provided with a pair of oppositely radially offset snubbing bars 45 and 46. The fabric F passes from the rearward guide bar 41 around the first snubbing bar 45, thence to and around the second snubbing bar 46, and thence over the forward guide bar 42, whence it passes to and over the cutting roll 10. It will be obvious that by rotating the frame 43 and the snubbing bars 45 and 46, angular paths of movement of the fabric may be quickly and easily increased or decreased to correspondingly increase or decrease the snubbing effect upon the fabric, whereby to modify the tension of the moving fabric as may, in any particular case, be desirable or necessary. To hold the tensioning means in selected adjusted condition, the frame 43 includes a ratchet wheel 47 adapted to be releasably engaged by a holding pawl 48.

To properly hold the fabric F to that portion of the surface of the cutting roll 10 over which it is desired to be moved subject to the cutting or slitting action of the knife member or members 15, another transverse guide bar 49 is suitably positioned between the cutting roll 10 and the traction rollers 34—35.

Beyond the traction rollers 34—35, a number of suitably positioned and driven take-up reels 50 are provided to receive and wind up into rolls the ribbons or strips F' into which the fabric F has been cut or slit by the knife member or members 15.

It will be obvious that the number and widths of the ribbons or strips F', into which the fabric F will be cut or slit, is dependent upon the number of knife members 15 employed and upon the relative spacing apart of said knife members upon the bolster or bridge bar 11 (see Fig. 2).

If it is desired to produce ribbons or strips F' of widths less than the thickness of the bodies of the knife members 15 and their carrier plates 12, the knife members may be furnished with a plurality of cutting blades 27 disposed in parallelly spaced relation according to the narrow width of ribbons or strips desired to be produced (see Fig. 7).

It will be understood that suitable means (not shown) may be provided for raising and lowering the bolster or bridge bar 11, whereby to bring the knife members carried thereby into and out of operative relation to the cutting roll 10.

The knife member or members of the apparatus, as thus far described, can well be used for cutting or slitting any kind of sheet material which is subject to cold cutting. In the cutting or slitting of piece goods woven from threads, filaments or yarns of synthetic material, it has been found that, if cold cut, the edges of the produced ribbons or strips will easily ravel or fray, and consequently a satisfactory product is not obtained. If, however, heat is applied to the cut edges of such ribbons or strips, which is sufficient in degree, the severed ends of the cross threads or filaments of the fabric will be fused so that adjacent ends will be joined one to another, whereby to provide durable non-raveling and non-fraying selvage edges. I have found that if the knife member or members be heated to a temperature of from 800 to 900 degrees F., the desired fusing of the cut edges of the produced ribbons or strips will be effected simultaneously with the cutting or slitting of the fabric. Having these circumstances in view, the knife members of the cutting or slitting apparatus of this invention are further provided with means for heating the same to a temperature which will cause the desired fusing of the raw edges of the ribbons or strips F' as produced by the cutting or slitting action thereof, whereby to provide said ribbons or strips with non-raveling and non-fraying selvage edges S (see Fig. 8).

The heating means for the knives, according to this invention, comprises one or more electrical heating elements 51 which are imbedded in one or more bores or chambers 52 disposed to extend longitudinally through the body of each knife member 15. The service conductors 53, which supply operating current to the heating elements 51, are connected with said heating elements at the rearward end of the body of the knife member 15 so as to deliver current thereto from a suitable source. Said conductors 53 are preferably carried in a cable 54 which is supported in connection with the body of the knife member 15 by means of a carrying bracket or clip 55 which is affixed to and which projects from the rear end of the knife member.

Having now described my invention, I claim:

1. A knife member adapted to be pivotally mounted and spring pressed toward a backing roll of fabric slitting apparatus, said knife member having an upwardly open longitudinal seating slot in its top portion, one end of said slot opening outwardly from the free end of the knife member, a detachable cutting blade disposed in said seating slot, said blade having notched ends, a cross-pin bridging the seating slot with which the inner notched end of the blade is engageable, a coupling clip having an angular tang to engage the outer notched end of the blade, and means to detachably affix said coupling clip to the free end of the knife member, whereby to rigidly hold the blade in operative assembled relation to said knife member.

2. A knife member adapted to be pivotally mounted and spring pressed toward a backing roll of fabric slitting apparatus, said knife member having an upwardly open longitudinal seating slot in its top portion, one end of said slot opening outwardly from the free end of the knife member, a detachable cutting blade disposed in said seating slot, said blade having notched ends, a cross-pin bridging the seating slot with which the inner notched end of the blade is engageable, a coupling clip having an angular tang to engage the outer notched end of the blade, means to detachably affix said coupling clip to the free end of the knife member, whereby to rigidly hold the blade in operative assembled relation to said knife member, and electrical heating means imbedded in the knife member for heating the blade assembled therewith.

JOSEPH M. VOLPI.

REFERENCES CITED

The following references are of record in the file of this patent:

UNITED STATES PATENTS

| Number | Name | Date |
|---|---|---|
| 347,492 | Marshall | Aug. 17, 1886 |
| 936,871 | Dunton | Oct. 12, 1909 |
| 1,246,327 | Rusterholz | Nov. 13, 1917 |
| 1,283,462 | Board | Nov. 5, 1918 |
| 1,608,789 | Good | Nov. 30, 1926 |
| 1,616,424 | Wheaton | Feb. 1, 1927 |
| 1,724,208 | Lewis | Aug. 13, 1929 |
| 1,751,575 | Davidson et al. | Mar. 25, 1930 |
| 2,114,272 | Temple | Apr. 12, 1938 |
| 2,251,282 | Huizeng | Aug. 5, 1941 |
| 2,287,398 | Taylor | June 23, 1942 |
| 2,437,295 | Eastwood | Mar. 9, 1948 |

FOREIGN PATENTS

| Number | Country | Date |
|---|---|---|
| 229,846 | Switzerland | Feb. 16, 1944 |